United States Patent
Blessing et al.

(10) Patent No.: US 7,350,810 B2
(45) Date of Patent: Apr. 1, 2008

(54) GAS GENERATOR

(75) Inventors: Uwe Blessing, Nuremberg (DE);
Jochem Gaertner, Nuremberg (DE);
Peter Lehniger, Erlangen (DE); Marc Alexander Winterhalder, Garching / Alz (DE)

(73) Assignee: Delphi Technologies, Inc., Troy, MI (US)

( * ) Notice: Subject to any disclaimer, the term of this patent is extended or adjusted under 35 U.S.C. 154(b) by 17 days.

(21) Appl. No.: 11/288,963

(22) Filed: Nov. 29, 2005

(65) Prior Publication Data

US 2006/0119086 A1 Jun. 8, 2006

(30) Foreign Application Priority Data

Dec. 8, 2004 (EP) .................................. 04029066
Dec. 22, 2004 (EP) .................................. 04030498

(51) Int. Cl.
*B60R 21/26* (2006.01)
(52) U.S. Cl. ...................................... 280/736; 280/741
(58) Field of Classification Search ................ 280/736, 280/737, 741
See application file for complete search history.

(56) References Cited

U.S. PATENT DOCUMENTS

| 4,370,930 | A | * | 2/1983 | Strasser et al. ............. 102/530 |
| 5,489,118 | A | * | 2/1996 | Carothers et al. ........... 280/741 |
| 5,622,380 | A | | 4/1997 | Khandhadia et al. ....... 280/736 |
| 5,628,528 | A | | 5/1997 | DeSautelle et al. ......... 280/736 |
| 5,851,027 | A | * | 12/1998 | DiGiacomo et al. ........ 280/736 |
| 6,019,389 | A | | 2/2000 | Burgi et al. ................. 280/736 |
| 6,032,979 | A | | 3/2000 | Mossi et al. ................. 280/741 |
| 6,053,531 | A | * | 4/2000 | Katsuda et al. ............. 280/741 |
| 6,149,193 | A | | 11/2000 | Canterberry et al. ........ 280/741 |
| 6,168,200 | B1 | | 1/2001 | Greist et al. ................. 280/736 |
| 6,189,922 | B1 | | 2/2001 | Parks et al. .................. 280/735 |
| 6,189,927 | B1 | * | 2/2001 | Mossi et al. ................. 280/741 |
| 6,406,053 | B1 | | 6/2002 | Bayer et al. ................. 280/530 |
| 6,422,601 | B1 | | 7/2002 | Quioc .......................... 280/741 |
| 6,447,007 | B1 | * | 9/2002 | DiGiacomo et al. ........ 280/741 |
| 6,491,321 | B1 | * | 12/2002 | Nakashima et al. ........ 280/736 |
| 6,543,805 | B2 | * | 4/2003 | McFarland et al. ......... 280/736 |
| 6,648,370 | B2 | * | 11/2003 | Koga et al. .................. 280/736 |
| 6,659,500 | B2 | | 12/2003 | Whang et al. ............... 280/741 |
| 6,709,012 | B1 | * | 3/2004 | Tanaka et al. ............... 280/736 |
| 6,722,694 | B1 | * | 4/2004 | Nakashima et al. ......... 280/736 |
| 6,877,435 | B2 | * | 4/2005 | Daoud ......................... 102/530 |
| 7,055,855 | B2 | * | 6/2006 | Nakashima et al. ........ 280/736 |

(Continued)

FOREIGN PATENT DOCUMENTS

DE 19726295 A1 1/1999

(Continued)

*Primary Examiner*—Ruth Ilan
*Assistant Examiner*—Joseph Rocca
(74) *Attorney, Agent, or Firm*—Douglas D. Fekete

(57) ABSTRACT

The present invention relates to a gas generator, in particular for airbag modules in motor vehicles, comprising a plurality of separate generator stages which can be ignited independently of one another and each of which includes in its own pressure housing at least one igniter, at least one propellant charge and at least one combustion chamber. The generator stages are arranged at least partly in a common filter housing together with a common filter unit and the space remaining in the filter housing is designed at least regionally as an outflow passage system leading from outflow apertures formed in the pressure housings to the filter unit.

25 Claims, 3 Drawing Sheets

U.S. PATENT DOCUMENTS

| | | | |
|---|---|---|---|
| 2002/0149177 A1* | 10/2002 | Rose et al. | 280/728.2 |
| 2003/0057688 A1* | 3/2003 | Koga et al. | 280/736 |
| 2003/0137138 A1* | 7/2003 | Nakashima et al. | 280/741 |
| 2004/0056458 A1* | 3/2004 | Daoud | 280/736 |
| 2004/0145166 A1* | 7/2004 | Smith | 280/736 |

FOREIGN PATENT DOCUMENTS

| | | |
|---|---|---|
| EP | 1090815 A | 4/2001 |
| EP | 1477375 A | 11/2004 |
| WO | 0068043 A | 11/2000 |

* cited by examiner

GAS GENERATOR

TECHNICAL FIELD

The present invention relates to a gas generator, in particular for airbag modules in motor vehicles, comprising two generator stages which each include in a pressure housing at least one igniter, at least one propellant charge and at least one combustion chamber.

BACKGROUND OF THE INVENTION

Such multi-stage gas generators are already known from the prior art. One or more generator stages can be ignited depending on the respective demands. The same gas generator can thus be used in vehicle applications for different airbag modules and different vehicle types. However, with the aid of a corresponding control, a decision can also be made with a gas generator installed with an airbag module in a vehicle in dependence on the magnitude of the impact, on different accident conditions or on the situation of use, e.g. the manner of seat occupation, which generator stages are ignited at which time.

With such multi-stage gas generators, it must be prevented by the geometrical arrangement and the design of the individual generator stages that, when one generator stage is ignited, the propellant charge of the other generator is also unintentionally ignited (sympathetic ignition). The housings of the individual generator stages must therefore be correspondingly insulated from one another, with the weight of the gas generator, however, simultaneously being kept as low as possible. Since such gas generators are mass products produced in very high volumes, the manufacture of the generator should moreover be as simple as possible despite these aforementioned demands. As few different parts as possible should in particular be used.

SUMMARY OF THE INVENTION

It is the object of the present invention to provide a gas generator of the initially named kind which is as light and as compact as possible in which the aforesaid problem of cross-ignition does not occur and which can nevertheless be produced in as simple and as cost-favorable manner as possible in high volumes.

This object is satisfied in accordance with the invention in that the generator stages are arranged at least partly in a common filter housing together with a common filter unit and in that the space remaining in the filter housing is designed at least regionally as an outflow passage system leading from outflow apertures formed in the pressure housings to the filter unit.

In accordance with the invention, due to the arrangement of the two generator stages in a common filter housing containing the filter unit, the space disposed at the interior of the filter housing and lying outside the combustion chambers can be used in a skilful manner as an outflow passage system through which the gases must flow. The gases are thus not only filtered so that a gas as free as possible of particles enters into the airbag, but can also already cool down before reaching the filter unit. Since the two generator stages not only each have their own housing (and not just a common housing with a partition wall is provided), but are formed overall as separate units which can be handled independently of one another, the gas generator can be assembled in a modular fashion from different modules, which substantially simplifies production and assembly.

Due to the arrangement of the filter unit outside the pressure housings, the latter can be made relatively small, whereby material and weight are saved. It was recognized that it is not necessary to arrange the filter unit inside a pressure housing, but that it is rather sufficient to provide a comparatively thin-walled filter housing which is then moreover advantageously used to satisfy specific additional functions.

Advantageous embodiments of the invention are described in the dependent claims and in the description in conjunction with the enclosed drawings.

In accordance with an embodiment of the invention preferred due to its simplicity, precisely two generator stages of different sizes are provided. The generator stages of different sizes permit a selection from numerous different ignition scenarios.

In accordance with a further preferred embodiment of the invention, the individual generator stages are arranged next to one another (so-called "stage-beside-stage" design. With generator stages arranged next to one another, different respective generator stages can be combined with one another and the assembly of the gas generator is particularly simple.

Seen in cross-section, the generator stages preferably fill the filter housing at least predominantly, with an outer contour of the generator stages being at least regionally complementary to an inner contour of the filter housing. An optimum utilization of space is ensured by this design and thus a particularly compact gas generator is realized overall.

In accordance with a further preferred embodiment of the invention, two generator stages each having a substantially semi-circular cross section are arranged in a filter housing having a substantially circular cross-section. Such an arrangement opens up numerous possibilities to position the filter unit skillfully, as will be explained in the following.

In accordance with another embodiment, the generator stages each have a cross-section in the form of a segment of a circle or of a segment of an annulus, with them likewise being able to be arranged in a filter housing having a substantially circular cross-section in this case. Like the previously described arrangement, this geometry is also characterized by the possibility of a skilful, space-saving arrangement of the filter unit.

In particular, generator stages which each have a cross-section in the form of a segment of an annulus are arranged such that they form a closed annulus at whose center a common outflow passage is provided. Such an outflow passage arranged at the center can basically be surrounded by any desired number of generator stages and permits a symmetrical carrying off of the arising gases in the direction of the filter unit. The gases can already cool down by expansion inside the outflow passage.

The filter unit is preferably arranged above the outflow openings.

An arrangement of the filter unit at least substantially between the generator stages is particularly advantageous. A filter unit arranged in this manner can be reached from a plurality of sides by the gases flowing out of the individual generator stages, which permits a particularly efficient filtering.

In accordance with another preferred embodiment of the invention, the filter unit can surround the generator stages at least regionally.

It is likewise advantageous to arrange the filter unit above the generator stages.

In accordance with a further preferred embodiment of the invention, the filter unit is in ring shape. The filter unit can e.g. surround the generator stages or lie on a full cylinder or a hollow cylinder formed by a plurality of generator stages together. Such an arrangement is characterized by its symmetry. A ring-shaped filter unit is moreover comparatively simple to assemble.

In accordance with a further preferred embodiment, outflow openings can be formed in a lower region of the pressure housings. In conjunction with a filter unit arranged above the generator stages, outflow openings formed in a lower region of the pressure housings make it possible for the generated gases to cool down by expansion inside the outflow passage system between the outflow openings and the filter unit before reaching the filter unit.

In accordance with a further preferred embodiment of the invention, at least one deflection position is provided in the outflow passage system which forces a change of direction, in particular by approximately 90°, on the gas flowing to the filter unit. Particles contained in the gas can already be removed from the gas flow at this deflection position before reaching the filter unit, and indeed particularly effectively if at least one impact surface extending approximately perpendicular to the flow of direction of the gas to be redirected is provided at the deflection position. The gases are deflected at this impact surface and particles contained therein are stopped so that they do not even reach the filter unit at all.

In accordance with a further preferred embodiment of the invention, a central outflow passage substantially extends over the total axial length of the filter housing and is surrounded by a filter unit in the region of the upper end wall of the filter housing. This arrangement is in particular of advantage due to its symmetry and moreover has the further advantage that the gases already cool down considerably when flowing through the relatively long outflow passage. The filter unit provided in the region of the upper end wall of the filter housing is in particular advantageous when outflow openings of the filter housing are arranged at the level of the filter unit in order to permit an outflow of the gases at the upper end of the filter housing, which is desired in accordance with the invention.

In accordance with another embodiment of the invention, the outflow openings can open into an outflow passage surrounding the generator stages.

The filter housing is preferably made as an outer housing of the generator. An additional outer housing of the generator is therefore not necessary, which thus saves costs, weight and installation space.

In accordance with a preferred further development of the invention, the filter housing can have a securing flange to attach the gas generator to an airbag module. The filter housing can thus be used as an outer housing of the generator without an additional connection piece being necessary for the attachment to the airbag module.

In accordance with an advantageous further development of the invention, the filter housing can be made such that it engages around the generator stages, and preferably also the filter unit, in the manner of a clamp. The stability of the total gas generator is increased and the filter housing provided with an additional function by such an arrangement.

It is particularly advantageous for outflow openings of the filter housing to be provided at the level of the filter unit. Such an arrangement is in particular to be preferred when the filter unit is located at the top in the filter housing and the latter also forms the outer housing of the generator, since the gas should flow out of the gas generator as far toward the top as possible, but still in a radial direction, for an optimum unfolding of the airbag.

In accordance with a further preferred embodiment of the invention, the filter housing can be expanded by the gas pressure generated by means of the generator stages so that it can assist a pressure buffer function. The pressure of the gas flowing out can be reduced by such an expansion of the filter housing such that the airbag is inflated with a lower force than with a filter housing of a less resilient design. This is above all of particular importance at high environmental temperatures, in comparison with lower environmental temperatures, which have the consequence of a higher maximum pressure which would have a full effect on the inflation behavior of the airbag without a pressure buffer. The dilatability of the filter housing can be set such that the inflation behavior is less dependent on the environmental temperature, that is such that the airbag does not behave too "aggressively" in summer and behaves sufficiently "dynamically" in winter. It must also be taken into account here that current regulations require a problem-free function and a simultaneous observation of safety requirements over a temperature range from −35° C. to +85° C., i.e. the gas generator must also be designed for very low temperatures. The pressure buffer function of the filter housing in particular ensures that the increased pressure development does not result in a bursting of the filter housing at very high temperatures.

BRIEF DESCRIPTION OF THE DRAWINGS

The present invention will be explained in more detail in the following with reference to two preferred embodiments and to the enclosed Figures. The Figures show in detail.

DESCRIPTION OF THE PREFERRED EMBODIMENT

A first embodiment of the invention should first be described with reference to FIGS. 1 and 2.

Figure 1:
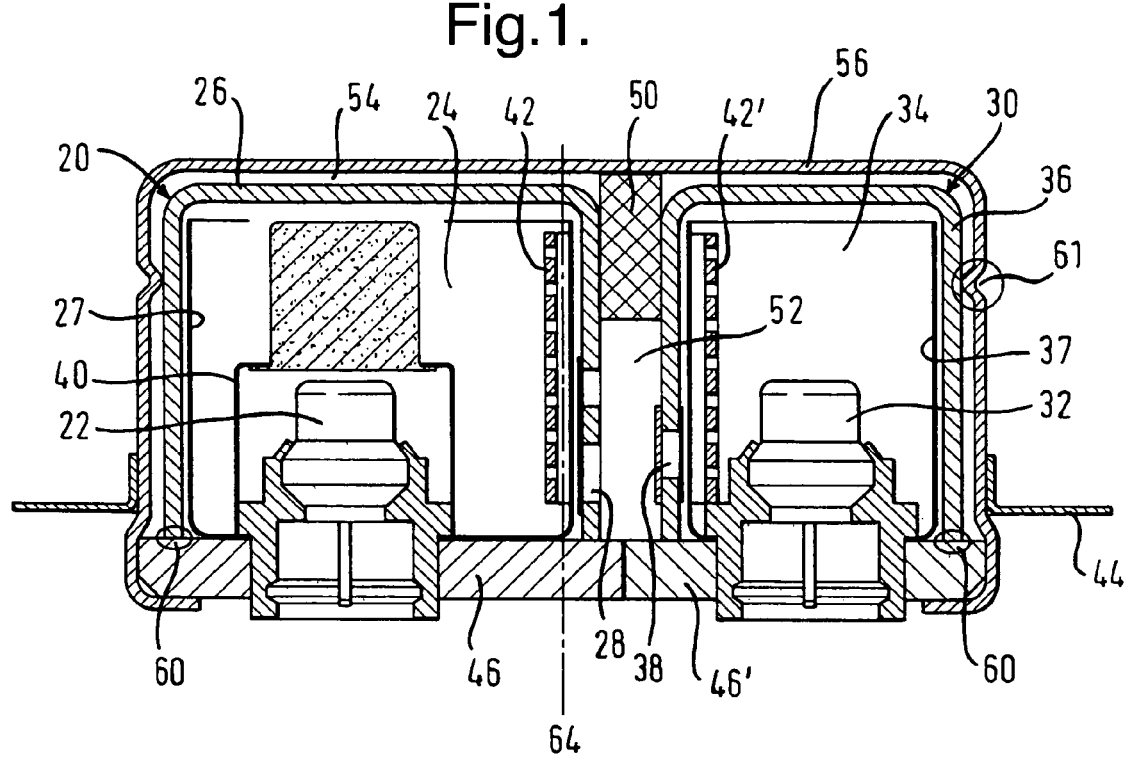
FIG. 1 is an axial section through a gas generator in accordance with a first embodiment of the invention.
Figure 2:
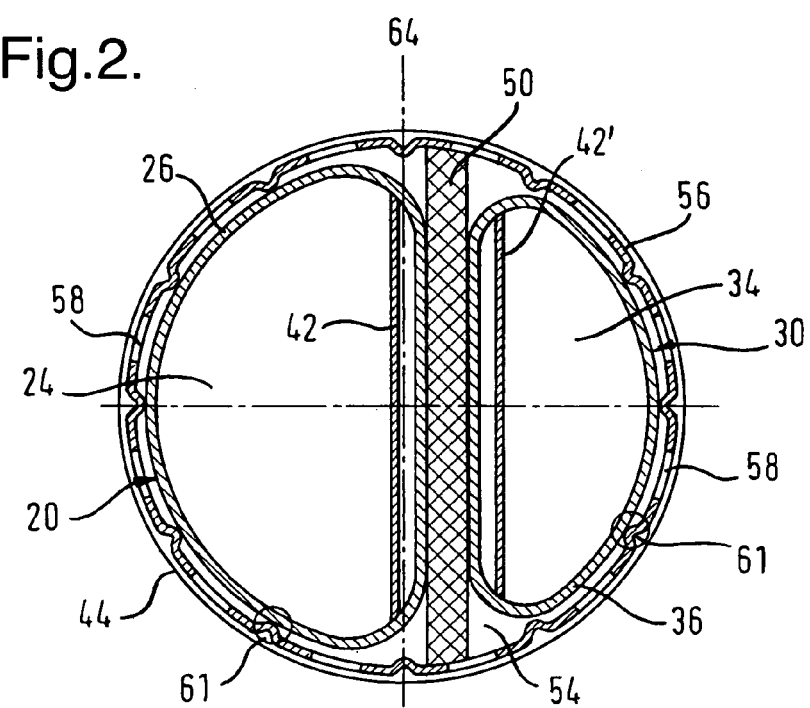
FIG. 2 is a radial section through the gas generator of FIG. 1 in a partly simplified representation.

FIG. 2 illustrates the basic design of the two-stage gas generator in accordance with a first embodiment of the invention having a substantially cylindrical shape overall. Two generator stages 20, 30, each having a substantially semi-circular cross-section and the same level, are arranged next to one another such that their common outer contour substantially forms a circle. The generator stage 20 at the left in FIGS. 1 and 2 is somewhat larger than the generator stage 30 at the right in the Figures and extends up to beyond a central plane 64 of the generator. Both generator stages 20, 30 are bounded by pressure housings 26, 36 which are semi-circular in cross-section and whose lower boundary in each case forms a correspondingly shaped base plate 46, 46', with the two base plates 46, 46' jointly forming a circle in cross-section. The side walls of the pressure housings 26, 36 are welded to the base plates 46, 46' at weld points 60. The base plates 46, 46' can likewise be welded together along their joint seam or be connected to one another mechanically—for example via a tongue and groove connection.

The base plates 46, 46' each protrude outwardly beyond the pressure housings 26, 36 so that a peripheral, radially projecting rim is formed. This rim not only simplifies the attachment of the filter housing 56, e.g. with the help of a reshaping operation such as a beaded joint or a rolled joint, but also opens up a variety of further possibilities of use and attachment, for example in passenger airbags, side airbags or curtain airbags.

The interior space of a pressure housing 26 of the larger generator stage 20 forms a combustion chamber 24 in which a propellant charge not shown in the Figures is stored in the form of pressed fuel pellets. Analogously, the interior of the smaller pressure housing 36 forms a combustion chamber 34 in which a second propellant charge (likewise not shown) is located.

As can be recognized in FIG. 1, a respective igniter 22, 32 is arranged in each generator stage 20, 30 and is inserted into the corresponding base plate 46, 46'. The two igniters 22, 32 each have a circular cross-section and are arranged approximately symmetrically to the central plane 64 of the gas generator.

The larger generator stage 20 is fitted with a booster container 40 which is pulled over the igniter 22 and has a cylindrical shape. This booster container 40, like the remaining space of the combustion chamber 24, is filled with fuel pellets and only opens when a specific threshold pressure has built up such that a very high pressure can be built up very quickly in the combustion chamber 24.

Collection gratings 42, 42' extend parallel to the central plane 64 of the generator in both combustion chambers 24, 34 in each case parallel to the mutually oppositely disposed planar inner side walls of the pressure housings 26, 36 and at a low spacing thereto. As can be seen in FIG. 1, the collection gratings 42, 42' extend over a substantial part, but not over the total height of the combustion chambers 24, 34. The fuel pellets of the propellant charges are prevented from clogging the outflow openings 28, 38 described in more detail further below by the collection gratings 42, 42'.

So-called charging containers 27, 37 are arranged in both pressure housings 20, 30. They are open vessels whose side walls extend parallel to the walls of the pressure housings at a low spacing thereto. The charging containers 27, 37 serve as an assembly aid on the filling of the fuel pellets into the pressure housings 20, 30. The pellets are first filled into the charging containers 27, 37, pushed over the pressure housings 20, 30 before them and welded to the base plates 46, 46'.

As can be recognized in FIG. 2, the two generator stages 20, 30 are arranged in a filter housing 56 having a substantially circular cross-section. Both generator stages 20, 30 lie completely inside the filter housing 56 which has a circular opening at its lower side to save weight and material. The filter housing 56 contacts the outer walls of the two pressure housings 26, 36 at fixing positions 61 in the form of point impressions spaced apart from one another uniformly in the peripheral direction and has a flange at the bottom with which it engages around the two base plates 46, 46' like a clamp.

A U-shaped filter unit 50 is arranged directly beneath the upper end wall of the filter housing 56 between the two generator stages 20, 30. The filter unit 50 extends from one side wall of the filter housing 56 up to the other side wall transversely through the filter housing 56, as can be seen in FIG. 2. The two U limbs project downwardly from the upper end of the filter housing 56 and can end above the axial center of the two generator stages 20, 30. The can, however, also extend along the side wall of the filter housing 56 up to the base plates 46, 46'.

The remaining free space between the two generator stages 20, 30 beneath the filter unit forms an outflow passage 52.

In both pressure housings 26, 36, the outflow openings 28, 38 opening into the outflow passage 52 are provided which lie in a lower region of the pressure housings 26, 36 and are thus located beneath the filter unit 50. A steel band covering the outflow openings 28, 38 or a differently shaped cover, which is not shown in FIGS. 1 and 2, is provided in the outflow passage 52 and prevents an unwanted cross-ignition between the two generator stages on time-offset ignition.

The filter housing 56 likewise has outflow openings 58 which are only shown in FIG. 2 and are located at the level of the filter unit 50 and thus above the outflow openings 28, 38 of the pressure housings 26, 36. The outflow openings 58 of the filter housing 56 are distributed at uniform intervals over the total periphery of the cylindrical filter housing 56 and are located at the same height as the fixing points 61 such that one respective fixing point 61 and one outflow opening 58 alternate in the peripheral direction, as can be seen in FIG. 2.

The provision of discrete fixing points 61, punctual fixing points here, which the filter housing 56 contacts at the pressure housings 26, 36, permits an onflow to the outflow openings 58 from all sides, i.e. does not mean any axial flow block.

A flange 44, for example a ring flange, which serves for the attachment of the gas generator to an airbag module, is attached to the filter housing 56, which also forms the outer housing of the gas generator in the embodiment shown in FIGS. 1 and 2, whereby the filter housing 56 satisfies a further additional function.

The gases generated in one or both generator stages 20, 30 arrive through the outflow openings 28, 38 in the outflow passage 52 in which they then flow upwardly in the direction of the filter unit 50. After filtering, the gases exit the filter unit 50 at their upper end in FIG. 1 and flow through the remaining inner space 54 of the filter housing 56 between the pressure housings 26, 36 and the filter housing 56 to the radial outflow openings 58 of the filter housing 56 through which they finally leave the gas generator.

The described two-stage gas generator can either be used such that only one of the two stages 20, 30 is ignited, or both generator stages 20, 30 are ignited offset in time or simultaneously. In particular on the ignition of both generator stages 20, 30, the outflow passage 52 outside the pressure housings 26, 36 also serves for the cooling down and mixing of the two gases generated by the two generator stages 20, 30.

Figure 3:
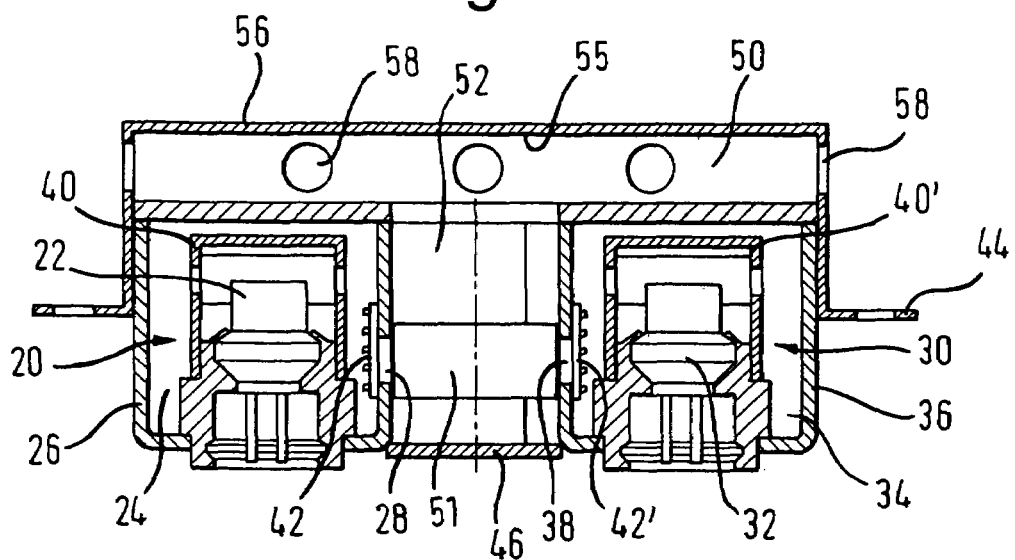
FIG. 3 is an axial section through a gas generator in accordance with a second embodiment of the invention.
Figure 4:
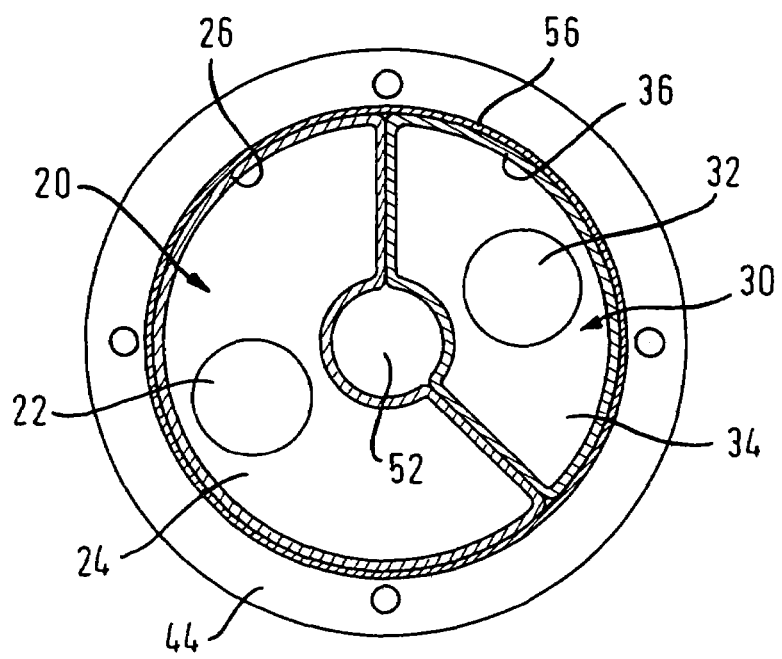
FIG. 4 is a radial section through the gas generator of FIG. 3 in a partly simplified representation.

FIGS. 3 and 4 show another embodiment of a gas generator in accordance with the invention which is likewise substantially cylindrical and which, like the gas generator previously described with reference to FIGS. 1 and 2 has two separate generator stages 20, 30 having their own pressure housings 26, 36. The same reference numerals have been used for the same components and in the following essentially only the differences to the previously described embodiment will be described. The previous description also applies to parts of the embodiment in accordance with FIGS. 3 and 4 which have the same reference numerals. This convention also applies to the further embodiment in accordance with FIGS. 5 and 6.

The two pressure housings 26, 36 each have a cross-section in the form of a segment of an annulus and together form a ring at whose center an axially extending outflow channel 52 is provided.

Apart from the geometry of the generator stages 20, 30, the gas generator shown in FIGS. 3 and 4 in particular differs from the previously described embodiment in that the filter housing 56, as can be recognized in FIG. 3, lies on the two generator stages 20, 30 in the manner of a cap. It merges here into a peripheral, radially projecting flange 44 which, as with the previous embodiment, serves for the attachment of the gas generator to an airbag module.

As can be recognized in FIG. 3, the two pressure housings 26, 36 extend in an axial direction in each case over approximately two thirds to three quarters of the height of the gas generator in this example and terminate upwardly in each case with a wall which extends parallel to and spaced apart from the filter housing 56.

An igniter 22, 32 having a circular cross-section is arranged in each of the two pressure housings 26, 36 respectively. No separate base plates for the pressure housings 26, 36 are provided, but their side walls are drawn downwardly and folded over inwardly so that they form the base of the generator stages 20, 30. One respective igniter 22, 32 is seated in this base in a corresponding recess. The generator stages 20, 30 are both fitted with a booster container 40, 40', such as was already described in connection with the embodiment shown in FIGS. 1 and 2.

A circular base plate 46 is provided between the two generator stages 20, 30 which terminates the central outflow passage 52 downwardly and is welded to the pressure housings 26, 36 of the two generator stages 20, 30.

In the upper region of the filter housing 56, a ring-shaped filter unit 50, or possibly one formed as a flat cylinder element, is arranged between its upper terminating wall and the two pressure housings. Said filter unit 50 lies on the two pressure housing 26, 36. A circular opening is preferably formed at its center and is aligned with the opening of the annulus formed by the two generator stages 20, 30. The outflow passage 52 extending in the center of the gas generator thus extends axially over the total length of the gas generator, starting from the base plate 46 between the pressure housings 26, 36 and through the filter ring 50 up to the upper terminating wall of the filter housing 56.

The upper terminating wall of the outflow passage 52 forms an impact surface 55 at which the upwardly flowing gases are deflected, as will be explained more precisely further below.

Both pressure housings 26, 36 have, in a lower region, outflow openings 28, 38 which open into the outflow passage 52 and in front of which collection gratings 42, 42' are interposed, as has already been described for the preceding embodiment. A ring-shaped steel band 51 is provided in the outflow passage 52 at the level of the outflow openings 28, 38.

Just as in the previously described embodiment, the filter housing 56 has radial outflow openings 58 arranged in its upper region.

The gas generated in the two generator stages 20, 30 flows out of the pressure housings 26, 36 through the outflow openings 28, 38 into the outflow passage 52 into whose interior the gases enter upwardly. The rising gases are deflected by approximately 90° at the impact surface 55 and flow radially outwardly through the filter 50 to the outflow openings 58.

On the deflection of the gas flow at the impact surface 55, at least some of the particles contained in the gas are stopped and thus do not even reach the filter unit 50.

Figure 5:
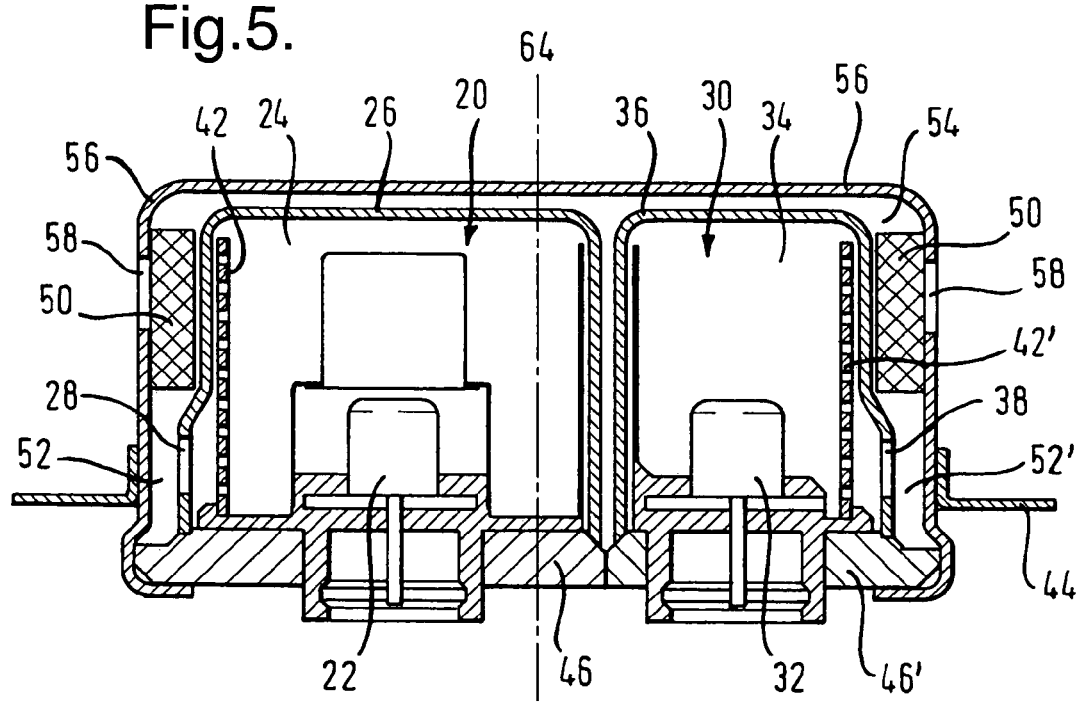
FIG. 5 is an axial section through a gas generator in accordance with a third embodiment of the invention.
Figure 6:
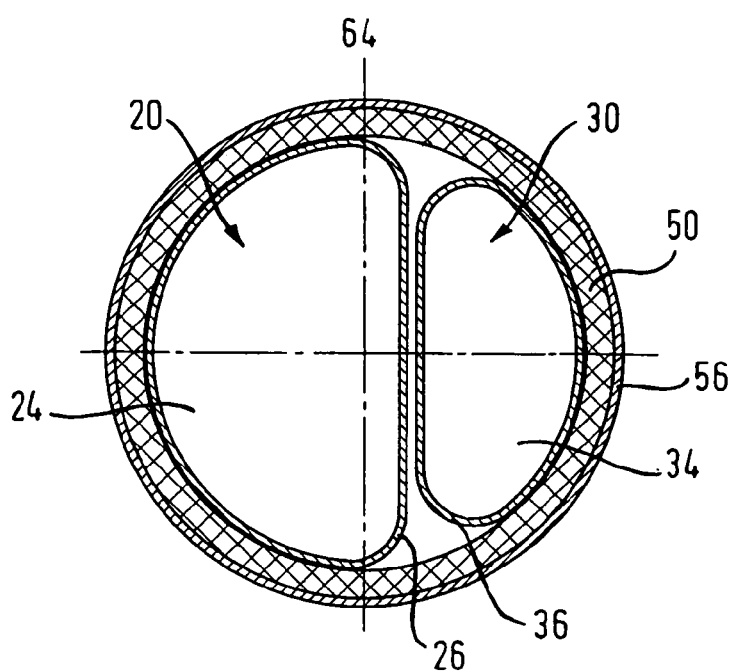
FIG. 6 is a radial section through the gas generator of FIG. 5 in a partly simplified representation.

The embodiment shown in FIGS. 5 and 6 is similar to the embodiment of FIGS. 1 and 2 and only the differences thereto are to be described in the following. The same reference numerals are also used for the same components here.

The filter unit 50 is not arranged between the two generator stages 20, 30, but surrounds them in ring-like manner. The filter ring 50 extends in the axial direction substantially over the upper half of the pressure housings 26, 36 which are widened outwardly beneath the filter unit 50.

Radial outflow openings 28, 38 of the two pressure housings 26, 36 are arranged in a lower region of the pressure housings 26, 36 and open into a ring-shaped outflow passage 52' which is located beneath the ring-shaped filter unit 50.

The outflow openings 58 of the filter housing 56 lie at the level of the ring-shaped filter 50.

The gases generated in the two generator stages 20, 30 thus exit the pressure housings 26, 36 downwardly through the outflow openings 28, 38 and flow upwardly parallel to the radially outer walls of the pressure housings 26, 36. They move further upwardly through the ring-shaped filter unit 50 up to the outflow openings 58 through which they finally radially exit the filter housing 56 and thus the gas generator.

The invention claimed is:

1. A gas generator for an airbag module, comprising:
 a filter housing having a first peripheral configuration;
 a first generator stage disposed within the filter housing, the first generator stage having a first pressure housing and an igniter disposed therein, the first pressure housing having a peripheral wall and a top portion connecting the peripheral wall, the peripheral wall having an outer wall portion and an inner wall portion;
 a second generator stage disposed within the filter housing, the second generator stage having a second pressure housing and an igniter disposed therein, the second pressure housing having a peripheral wall and a top portion connecting the peripheral wall, the peripheral wall having an outer wall portion and an inner wall portion, the first pressure housing and the second pressure housing being arranged within the filter housing such that the inner wall portion of the first pressure housing and the inner wall portion of the second pressure housing define a central outflow passage while the outer wall portion of the first pressure housing and outer wall portion of the second pressure housing define an outer periphery that contacts an inner surface of a wall of the filter housing defining the first peripheral configuration;
 a plurality of openings disposed in the wall of the filter housing defining the first peripheral configuration;
 a flow path provided between the plurality of openings and the central outflow passage; and
 a filter disposed in the filter housing such that gas flow from the central outflow passage passes through the filter prior to exiting the gas generator via the plurality of openings disposed in the wall of the filter housing.

2. A gas generator in accordance with claim 1, wherein the first generator stage and the first pressure housing is larger than the second generator stage and second pressure housing.

3. A gas generator in accordance with claim 1, wherein the filter is arranged above the plurality of openings.

4. A gas generator in accordance with claim 1, wherein the filter is arranged at least substantially between the first pressure housing and the second pressure housing.

5. A gas generator in accordance with claim 1, wherein the filter is located above the top wall portion of the first generator stage and the top wall portion of the second generator stage.

6. A gas generator in accordance with claim 1, wherein the inner wall portion of the first pressure housing and the inner wall portion of the second pressure housing each have a plurality of openings in fluid communication with the central outflow passage when the gas generator is ignited.

7. A gas generator in accordance with claim 1, wherein the plurality of openings are located above the top portion of the first pressure housing and the top portion of the second pressure housing and gas flow from the central outflow passage impacts an impact surface of the filter housing.

8. A gas generator in accordance with claim 7, wherein the impact surface is positioned perpendicular to gas flow from the central outflow passage.

9. The gas generator as in claim 1, wherein contact between the outer periphery defined by the outer wall portion of the first pressure housing and the outer wall portion of the second pressure housing and the inner surface of the wall of the filter housing is facilitated by a plurality of fixing impressions formed in the wall of the filter housing.

10. The gas generator as in claim 9, wherein the plurality of fixing impressions are alternately arranged with the plurality of openings in the wall of the filter housing.

11. The gas generator as in claim 1, wherein the inner wall portion of the first pressure housing and the inner wall portion of the second pressure housing each comprise a curved portion bounded by a pair of planar surfaces and the curved portion of the inner wall portion of the first pressure housing and the inner wall portion of the second pressure housing define the central outflow passage while the pair of planar surfaces of the inner wall portion of the first pressure housing and the iner wall portion of the second pressure housing contact each other.

12. A gas generator as in claim 11, wherein the curved portion of the inner wall portion of the first pressure housing and the inner wall portion of the second pressure housing each have a plurality of openings in fluid communication with the central outflow passage when the gas generator is ignited.

13. A gas generator as in claim 12, wherein the igniter of the first generator stage and the second generator stage are capable of being independently actuated.

14. A gas generator as in claim 1, wherein the peripheral wall of the first pressure housing is welded to a first base plate and the peripheral wall of the second pressure housing is weld to a second base plate, the first base plate and the second base plate each being configured to contact each other proximate to the central outflow passage and the filter housing secures the first base plate and the second base to each other.

15. A gas generator as in claim 8, wherein the filter housing is secured to the first generator stage and the second generator stage by a reshaping operation comprising a rolled joint or a beaded joint.

16. A gas generator as in claim 1, wherein the filter housing is secured to the first generator stage and the second generator stage by a welding process.

17. A gas generator as in claim 1, wherein the filter housing further comprises a peripheral mounting flange and the plurality of openings in the wall of the filter housing are proximate to a point of contact between the inner surface of the wall of the filter housing and the outer periphery defined by the outer wall portion of the first pressure housing and the second pressure housing.

18. The gas generator as in claim 1, wherein the peripheral wall of the first pressure housing is secured to a first base plate and the peripheral wall of the second pressure housing is secured to a second base plate, the first base plate and the second base plate each having a configuration such that when assembled together the first base plate and the second base plate define a periphery substantially similar to the first peripheral configuration of the filter housing such that the filter housing can be secured to the first base plate and the second base plate to secure the first pressure housing and the second pressure housing within the filter housing.

19. A gas generator as in claim 1, wherein the outer periphery defined by the outer wall portion of the first pressure housing and the outer wall portion of the second pressure housing is substantially the same configuration as the first peripheral configuration.

20. A gas generator as in claim 1, wherein the outer periphery defined by the outer wall portion of the first pressure housing and the outer wall portion of the second pressure housing is circular and the first peripheral configuration is circular.

21. A gas generator for an airbag module, comprising:
a filter housing having a first peripheral configuration;
a first generator stage disposed within the filter housing, the first generator stage having a first pressure housing and an igniter disposed therein, the first pressure housing having a peripheral wall and a top portion connecting the peripheral wall, the peripheral wall having an outer wall portion and an inner wall portion;
a second generator stage disposed within the filter housing, the second generator stage having a second pressure housing and an igniter disposed therein, the second pressure housing having a peripheral wall and a top portion connecting the peripheral wall, the peripheral wall having an outer wall portion and an inner wall portion, the first pressure housing and the second pressure housing being arranged within the filter housing such that the inner wall portion of the first pressure housing and the inner wall portion of the second pressure housing define a central outflow passage while the outer wall portion of the first pressure housing and outer wall portion of the second pressure housing define an outer periphery that is substantially similar to the first peripheral configuration defined by the wall of the filter housing and the outer periphery defined by the outer wall portion of the first pressure housing and the outer wall portion of the second pressure housing is in a facing spaced relationship with an inner surface of the wall of the filter housing;
a plurality of openings disposed in the wall of the filter housing defining the first peripheral configuration;
a flow path provided between the plurality of openings and the central outflow passage; and
a filter disposed between the plurality of openings in the wall of the filter housing and the outer periphery defined by the outer wall portion of the first pressure housing and the outer wall portion of the second pressure housing such that gas flow from the central outflow passage passes through the filter prior to exiting the gas generator via the plurality of openings disposed in the wall of the filter housing.

22. A gas generator as in claim 21, wherein the filter is ring shaped.

23. A gas generator as in claim 21, wherein the peripheral wall of the first pressure housing is welded to a first base plate and the peripheral wall of the second pressure housing is weld to a second base plate, the first base plate and the second base plate each being configured to contact each other proximate to the central outflow passage and the filter housing secures the first base plate and the second base to each other.

24. A gas generator as in claim 21, wherein the inner wall portion of the first pressure housing and the inner wall portion of the second pressure housing each have a plurality of openings in fluid communication with the central outflow passage when the gas generator is ignited.

25. A gas generator as in claim 21, wherein the igniter of the first generator stage and the second generator stage are capable of being independently actuated and the first generator stage is larger than the second generator stage.

* * * * *